US010968868B2

(12) United States Patent
Berkemeier et al.

(10) Patent No.: US 10,968,868 B2
(45) Date of Patent: Apr. 6, 2021

(54) METHODS AND SYSTEMS FOR A LUBRICATING DEVICE (71) Applicant: Ford Global Technologies, LLC, Dearborn, MI (US)

(72) Inventors: Oliver Berkemeier, Bergisch Gladbach (DE); Bernd Steiner, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 16/242,972

(22) Filed: Jan. 8, 2019

(65) Prior Publication Data

US 2019/0211779 A1 Jul. 11, 2019

(30) Foreign Application Priority Data

Jan. 11, 2018 (DE) .......................... 102018200410.2

(51) Int. Cl.
*F02M 21/02* (2006.01)
*F02M 21/04* (2006.01)
*F01M 1/02* (2006.01)
*F01M 1/16* (2006.01)

(52) U.S. Cl.
CPC .......... *F02M 21/0245* (2013.01); *F01M 1/02* (2013.01); *F01M 1/16* (2013.01); *F02M 21/0215* (2013.01); *F02M 21/042* (2013.01); *F02M 2200/02* (2013.01)

(58) Field of Classification Search
CPC ........... F02M 21/0245; F02M 21/0215; F02M 2200/02; F02M 21/0227; F02M 21/0218; F02M 21/0239; F02M 21/042; F01M 1/16; F01M 1/02; F01M 9/00
See application file for complete search history.

(56) References Cited

U.S. PATENT DOCUMENTS

| 2,127,880 | A | * | 8/1938 | Medsker | C10J 1/213 48/93 |
| 2,308,773 | A | * | 1/1943 | Norgren | F16N 7/34 184/55.2 |
| 2,735,512 | A | * | 2/1956 | Name Not Available | F16N 7/34 184/55.2 |

(Continued)

FOREIGN PATENT DOCUMENTS

| DE | 69009141 T2 | 12/1994 |
| DE | 69612045 T2 | 7/2001 |

(Continued)

*Primary Examiner* — Sizo B Vilakazi
*Assistant Examiner* — Brian R Kirby
(74) *Attorney, Agent, or Firm* — Geoffrey Brumbaugh; McCoy Russell LLP (57) ABSTRACT

Methods and systems are provided for a compressed natural gas fuel rail. In one example, a system comprises a device having a first volume for housing compressed natural gas and a second volume for housing lubricant, the first and second volumes arranged in a single housing and separated by a barrier. Lubricant flow from the second volume to the first volume may be adjusted by adjusting a pressure of the second volume so that a pressure difference between the second and first volumes is increased to increase lubricant flow or decreased to decrease lubricant flow.

19 Claims, 5 Drawing Sheets

(56) References Cited

U.S. PATENT DOCUMENTS

| | | | | |
|---|---|---|---|---|
| 2,965,085 | A | * | 12/1960 | Kahler ............... F02M 21/00 123/527 |
| 3,251,661 | A | * | 5/1966 | Kieninger ............ C10L 1/308 44/358 |
| 3,521,727 | A | * | 7/1970 | Hitschmann ............ F16N 7/34 184/39.1 |
| 3,807,530 | A | * | 4/1974 | Fodali ................ F16N 7/34 184/55.2 |
| 3,883,322 | A | * | 5/1975 | Bivins, Jr. ............ B01D 3/322 48/180.1 |
| 3,970,219 | A | * | 7/1976 | Spitzer ............... B65D 83/62 222/1 |
| 4,111,219 | A | * | 9/1978 | Hallberg ............. B01D 1/0017 137/3 |
| 4,133,632 | A | * | 1/1979 | Nakano ............... F23D 5/045 431/328 |
| 4,150,954 | A | * | 4/1979 | Abthoff ................ C01B 3/38 123/3 |
| 4,325,341 | A | * | 4/1982 | Yamauchi ........... F02M 69/047 123/472 |
| 4,358,414 | A | * | 11/1982 | Webster ............. F02M 29/10 123/336 |
| 4,376,423 | A | * | 3/1983 | Knapstein ............ F02M 71/00 123/1 A |
| 4,856,484 | A | * | 8/1989 | Wilson ................. F01M 3/00 123/525 |
| 5,575,904 | A | * | 11/1996 | Suzuki ............... B01D 24/047 210/186 |
| 5,758,865 | A | * | 6/1998 | Casey ............... F02M 21/0254 251/129.21 |
| 5,769,058 | A | * | 6/1998 | Scogin ............... F02B 63/06 123/527 |
| 5,941,210 | A | * | 8/1999 | Hill ................. F02M 65/008 123/305 |
| 6,258,858 | B1 | * | 7/2001 | Nakajima ............ B01D 17/041 516/73 |
| 6,427,660 | B1 | * | 8/2002 | Yang ................ F02D 19/081 123/304 |
| 6,513,505 | B2 | * | 2/2003 | Watanabe ............ F02M 25/00 123/525 |
| 6,588,406 | B2 | * | 7/2003 | Oprea .............. F02M 21/0281 123/525 |
| 7,011,048 | B2 | * | 3/2006 | Gurin ............... F02M 29/04 123/1 A |
| 7,198,023 | B1 | | 4/2007 | Coates |
| 7,255,722 | B2 | * | 8/2007 | Shiraishi ............ B01D 39/1623 210/489 |
| 7,308,889 | B2 | * | 12/2007 | Post ................. F02M 55/005 123/527 |
| 7,406,955 | B1 | * | 8/2008 | Gachik .............. F02M 37/0064 123/522 |
| 7,493,897 | B2 | * | 2/2009 | Arakawa ............. B01D 61/027 123/304 |
| 7,853,396 | B2 | * | 12/2010 | Ito ................. F02D 41/3017 701/103 |
| 7,891,579 | B2 | * | 2/2011 | Mashida ............ F02M 21/0263 239/96 |
| 8,166,956 | B2 | * | 5/2012 | Ulrey ................ F02D 19/0689 123/525 |
| 8,211,300 | B2 | | 7/2012 | Partridge et al. |
| 8,220,439 | B2 | * | 7/2012 | Fisher ............... F02D 19/0647 123/525 |
| 8,550,058 | B2 | * | 10/2013 | Pursifull ............ F02D 19/0605 123/575 |
| 8,656,869 | B2 | | 2/2014 | Leone et al. |
| 9,382,854 | B2 | | 7/2016 | Leone |
| 10,619,599 | B1 | * | 4/2020 | Walser ............... F02D 19/081 |
| 2005/0193985 | A1 | * | 9/2005 | Czimmek .......... F02M 21/0215 123/470 |
| 2007/0079815 | A1 | * | 4/2007 | Shinkarenko ...... F02M 21/0287 123/525 |
| 2008/0283019 | A1 | * | 11/2008 | Arakawa .............. F01M 1/10 123/196 R |
| 2009/0084366 | A1 | * | 4/2009 | Gachik ............... F02B 21/00 123/585 |
| 2010/0010727 | A1 | * | 1/2010 | Cippitani ........... F02D 19/027 701/103 |
| 2010/0078371 | A1 | * | 4/2010 | Saito ................ C10M 175/06 210/149 |
| 2010/0107603 | A1 | * | 5/2010 | Smith ............... F02C 7/224 60/267 |
| 2010/0206260 | A1 | * | 8/2010 | Tobias ............... F01L 1/16 123/188.9 |
| 2011/0290207 | A1 | * | 12/2011 | Kaufman ............. F02M 25/14 123/1 A |
| 2013/0055987 | A1 | * | 3/2013 | Wirz ............... F02D 19/10 123/304 |
| 2013/0160741 | A1 | * | 6/2013 | Sommars ........... F02D 19/0694 123/456 |
| 2014/0020773 | A1 | * | 1/2014 | Sommars ............. F02M 43/04 137/511 |
| 2014/0100765 | A1 | * | 4/2014 | Maki ................ F01M 1/16 701/113 |
| 2014/0116393 | A1 | * | 5/2014 | Fiveland ............. F02B 7/06 123/470 |
| 2014/0200796 | A1 | * | 7/2014 | Bidner .............. F02D 19/12 701/111 |
| 2014/0363550 | A1 | | 12/2014 | Hamer et al. |
| 2015/0000638 | A1 | * | 1/2015 | Monros ............. F02D 19/0694 123/456 |
| 2017/0037788 | A1 | * | 2/2017 | Czaplewski ......... F01M 3/02 |
| 2018/0195479 | A1 | * | 7/2018 | Perko ............... F02M 21/0227 |

FOREIGN PATENT DOCUMENTS

| | | |
|---|---|---|
| DE | 102007036217 A1 | 2/2009 |
| JP | 54142434 A * | 1/2000 |
| JP | 2006292089 A * | 1/2000 |
| JP | 2006316801 A * | 1/2000 |
| WO | 2004013484 A2 | 2/2004 |
| WO | 2009015894 A1 | 2/2009 |

* cited by examiner

METHODS AND SYSTEMS FOR A LUBRICATING DEVICE

CROSS REFERENCE TO RELATED APPLICATION

This application claims priority to German Patent Application No. 102018200410.2, filed Jan. 11, 2018. The entire contents of the above-referenced application are hereby incorporated by reference in their entirety for all purposes.

FIELD

The present description relates generally to a lubricating device for a fuel injection nozzle of an internal combustion engine.

BACKGROUND/SUMMARY

Recently, natural gas has also been increasingly used as a fuel for motor vehicles with corresponding engines. The storage, transportation, and refueling are either carried out as Compressed Natural Gas (CNG), which may be heavily compressed but still gaseous natural gas, or as liquefied natural gas (LNG), which may be natural gas which has been liquefied by severe cooling and is kept in liquid form through storage in pressurized vessels.

The advantage of natural gas may be fewer emissions as a result of combustion compared to gasoline and diesel. In the case of CNG this is because, on the one hand, CNG is already present in a homogeneous gaseous form in the combustion chamber and not in an atomized form like gasoline and diesel, and, on the other hand, the molecule chains contain only approximate half as many carbon atoms with respect to the hydrogen atoms as those in gasoline and diesel, that is when combustion occurs with oxygen more water ($H_2O$) and less carbon dioxide ($CO_2$), and soot are produced.

At normal atmospheric pressure (e.g., 1 atm and/or about 1 bar), natural gas has a very low energy density in comparison with diesel fuel, for example—at 0.036 MJ/Liter a lower volumetric calorific value than that of diesel which is 34.7 MJ/Liter, the natural gas is compressed to approximately 200 bar, in order to be able to carry along a sufficient quantity of energy with an acceptable volume in the motor vehicle.

The drive differs in that, instead of a gasoline/air mixture, a natural gas/air mixture is compressed, ignited and burnt in the cylinders.

Internal combustion engines which are operated with CNG as the fuel may comprise injection nozzles different than injection nozzles found in gasoline and diesel engines. For continuous operation, a minimum degree of lubrication may be desired, but the fuel CNG does not provide this while gasoline and diesel may additionally function as lubricants. Thus, CNG injection nozzles may demand an auxiliary source of lubrication not common to gasoline and diesel engines. A certain degree of lubrication is brought about by the fact that leaked oil passes from a compressor of a CNG filling station to the inlet nozzles. However, this is not sufficiently reliable. Therefore, the service life and operational reliability are limited, since the lack of lubrication may cause increased wear.

Therefore, an object of the present disclosure is to indicate ways in which the lubrication of an injection nozzle of an internal combustion engine which is operated with CNG as a fuel can be improved.

The object of the present disclosure is achieved by a device for metering lubricant for a fuel injection nozzle for injecting CNG into an internal combustion engine, with an injection rail with a first volume for holding lubricant and a second volume for holding CNG, wherein the first volume is separated from the second volume by a separator element which is embodied so as to be permeable to lubricant.

The inflow of lubricant can be influenced in a targeted fashion by the separator element. During operation, a sufficient quantity of lubricant may be supplied, with the result that degradation owing to a lack of lubrication is mitigated.

According to one embodiment, the separator element may comprise a sponge-like structure at least in certain sections. For example, the separator element can be fabricated from a foamed material, such as e.g. plastic or metal. In this context, the separator element has, in the sections with the sponge-like structure, an open-celled construction, (e.g., the cell walls are not closed). Therefore, the separator element can take up fluids and allow them to pass.

According to a further embodiment, the separator element has a semi-permeable layer for the lubricant at least in certain sections. For example, the separator element can have sections which permit only molecules with less than a specific mole mass or colloids or particles of less than a specific size to pass through, while relatively large molecules or colloids cannot pass.

According to a further embodiment, the separator element is a perforated plate at least in certain sections. The plate can be perforated during its manufacture or after its manufacture by the introduction and/or machining of through-openings.

According to a further embodiment, lubricant can be fed into the second volume through an oil port. The oil port can be connected to a lubricant circuit of the internal combustion engine, with which components of the internal combustion engine, such as pistons mounted in cylinders, can be lubricated. For this purpose, the oil port can be connected to an oil gallery or to an oil sump of the internal combustion engine. In addition, convenient refilling can also be carried out through the oil port when the lubricant supply is exhausted.

According to a further embodiment, lubricant can be pressurized in the second volume by a pressure port. Thus, a feed pressure can be built up by which lubricant can be fed to the fuel injection nozzle. This may occur without a pump.

According to a further embodiment, the pressure port is connected by a branch line to a gas line with which CNG can be fed into the first volume. Therefore, the high gas pressure under which CNG is stored is used to supply the feed pressure. Drive assemblies for generating pressure can thus be dispensed with.

According to a further embodiment, a gas pressure regulator is assigned to the branch line. With the gas pressure regulator, it is possible to regulate the gas pressure and therefore the feed pressure. With the gas pressure regulator, it is thus possible to even out pressure fluctuations in the pressure with which CNG is stored. When desired, the feed pressure can also be increased in order thereby to increase the feed rate of the lubricant if necessary.

In one example, the issues described above may be addressed by a system comprising a device comprising a first volume fluidly coupled to a lubricant port, a second volume configured to deliver compressed-natural-gas directly to an injection rail, wherein the first volume and the second volume are separated by a separator element shaped to allow lubricant to flow from the first volume to the second volume. In this way, the fuel injectors configured to inject a non-lubricating fuel may receive lubrication.

As one example, an amount of lubricant flowing from the first volume to the second volume may be adjusted via adjusting a pressure of the first volume. The first volume pressure may be adjusted via one or more of a pressure regulator and/or an oil pump. By doing this, the device may precisely flow a desired amount of lubricant such that the fuel injectors are sufficiently lubricated while preventing over-lubrication, thereby conserving lubricant for other components desired lubrication.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
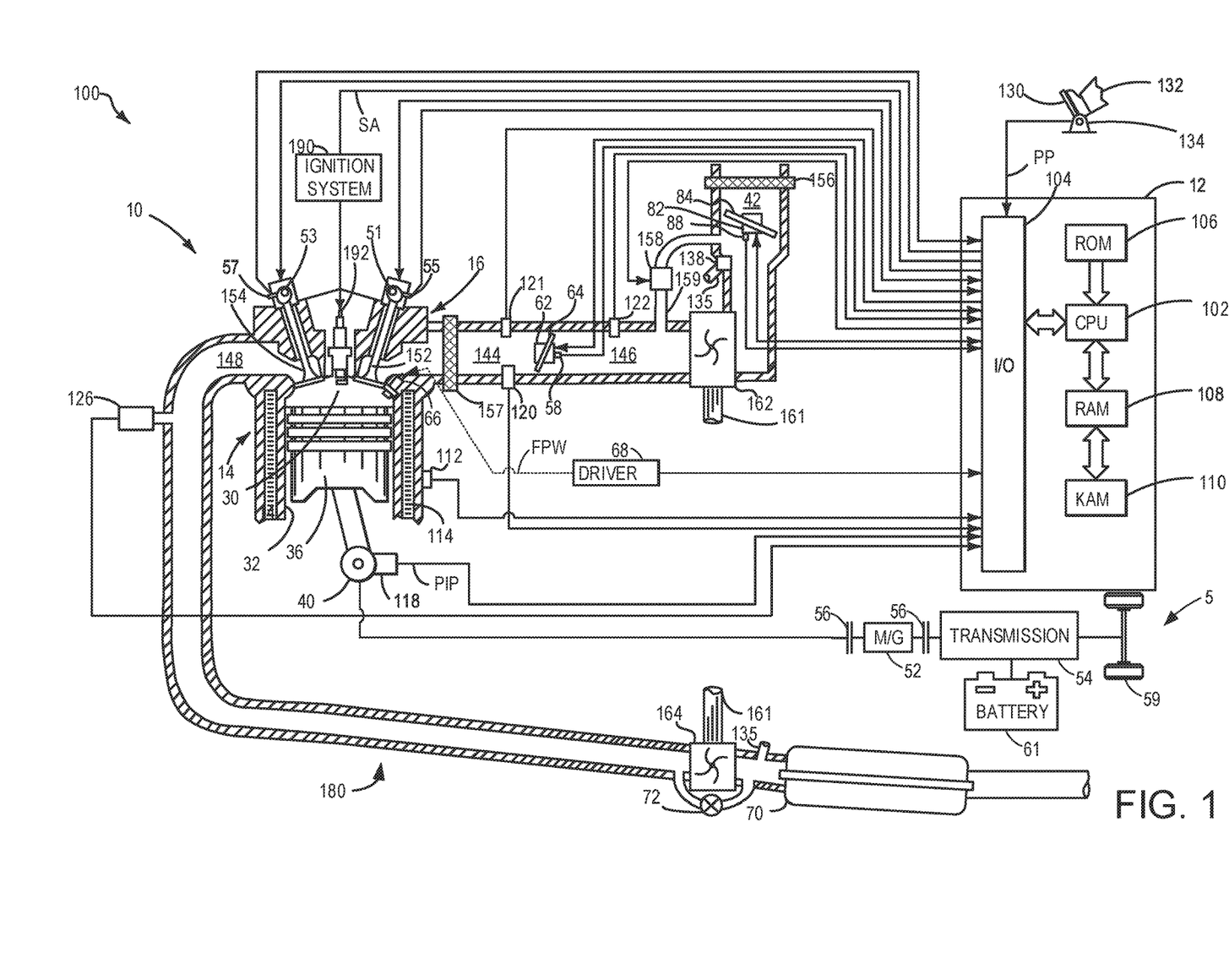
FIG. 1 illustrates a schematic of an engine included in a hybrid vehicle.
Figure 2:
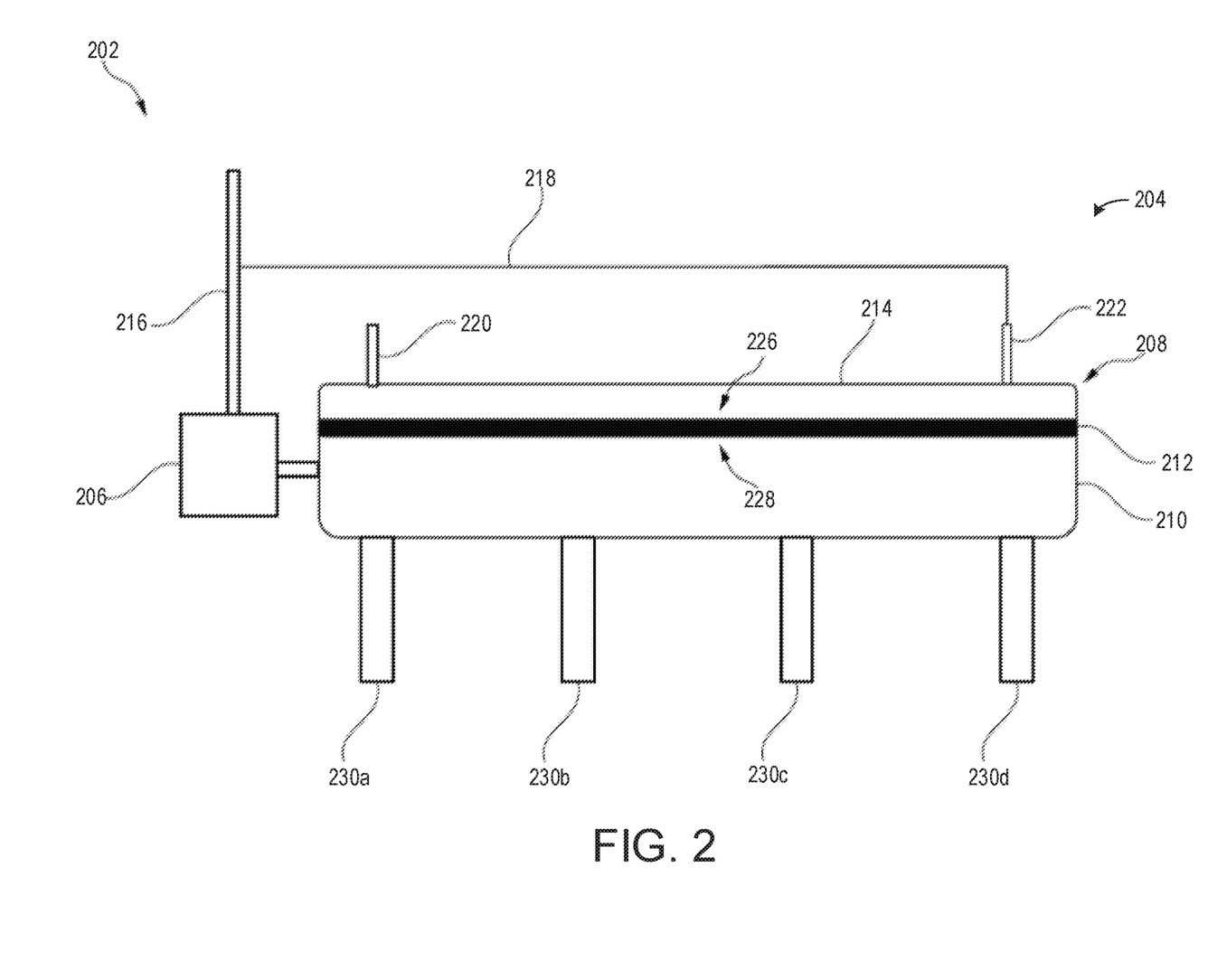
FIG. 2 illustrates a schematic illustration of an internal combustion engine having a device for metering lubricant according to a first embodiment.
Figure 3:
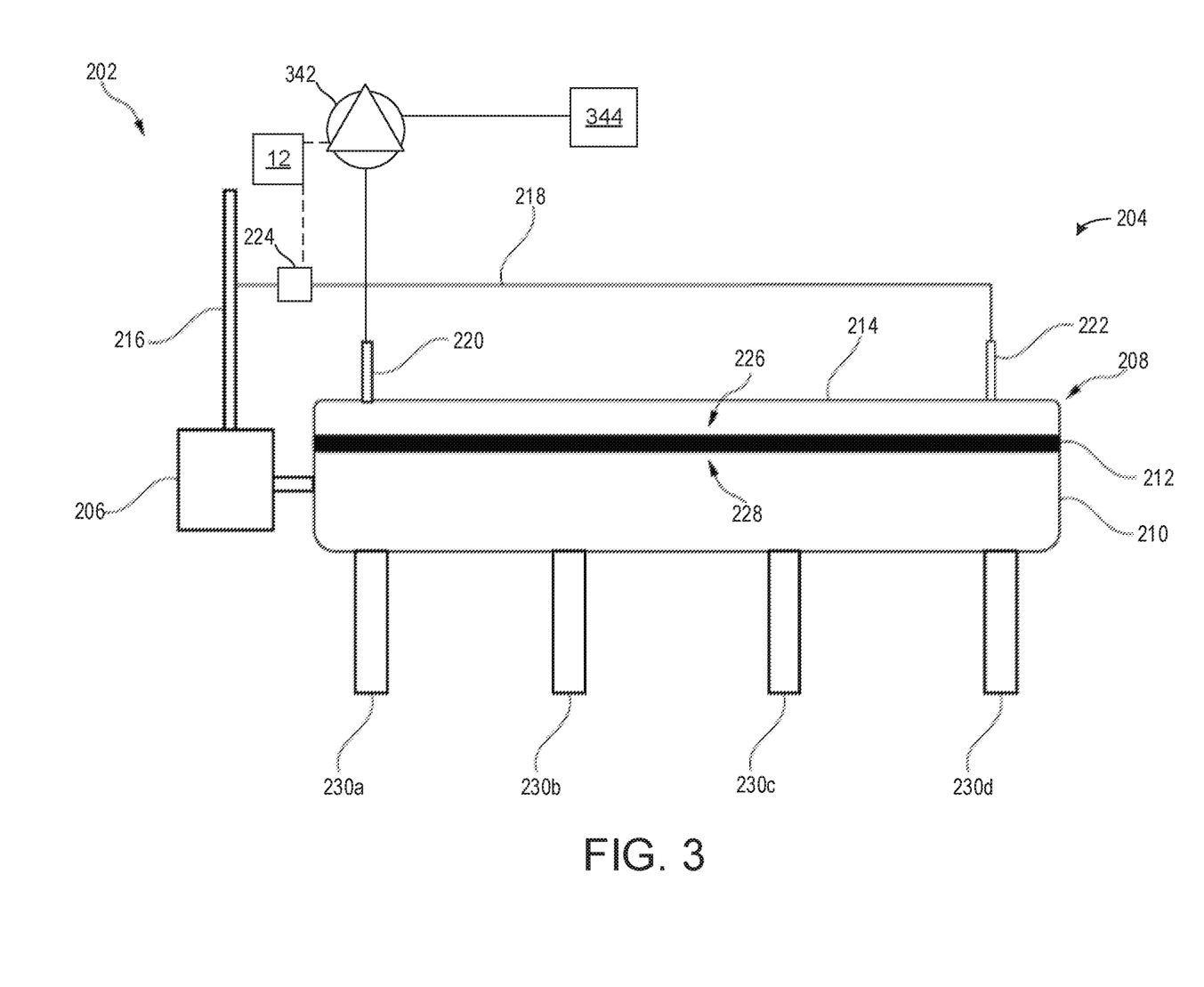
FIG. 3 illustrates a schematic illustration of an internal combustion engine having a device for metering lubricant according to a second embodiment.
Figure 4:
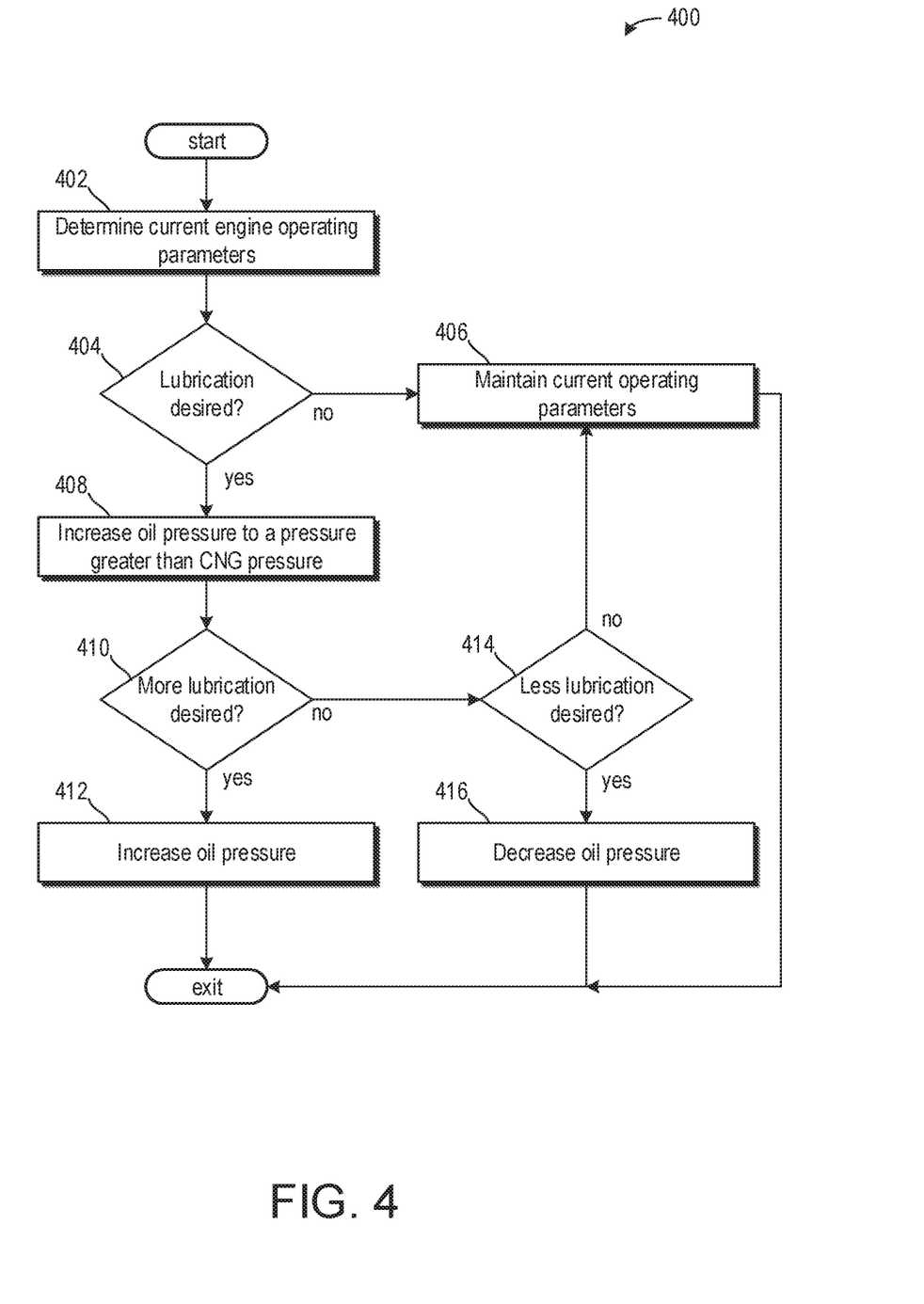
FIG. 4 illustrates a method for metering a lubricant flow.
Figure 5:
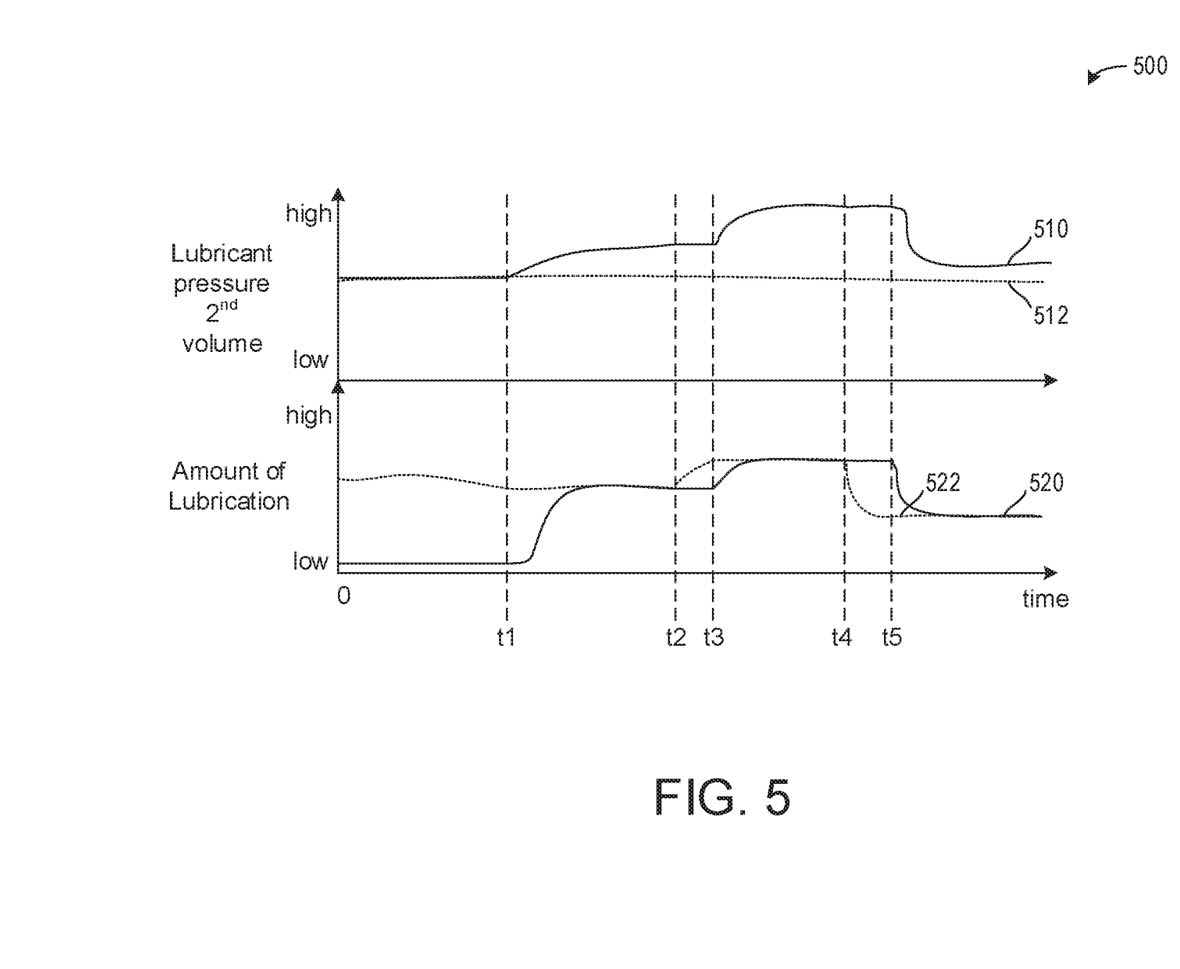
FIG. 5 illustrates an engine operating sequence plotting lubricant pressure adjustments in response to a desired amount of lubrication.

The following description relates to systems and methods for a device shaped to provide lubricant and fuel to a plurality of fuel injectors configured to inject compressed-natural-gas (CNG). An example of a fuel injector of the fuel injectors is shown in FIG. 1. Therein, the injector is positioned to inject directly into a combustion chamber. FIGS. 2 and 3 illustrate alternate embodiments of a device comprising a first volume configured to receive lubricant and a second volume configured to receive CNG, wherein the first and second volumes are arranged in a common housing and are separated from one another via a barrier. The barrier may be at least partially porous to allow lubricant to pass therethrough to the second volume. A method for adjusting an amount of lubricant flowing from the first volume to the second volume is shown in FIG. 4. An engine operating sequence illustrating a change in an amount of lubrication based on a pressure difference between the first volume and the second volume is shown in FIG. 5.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a compressed-natural-gas (CNG) engine, and the fuel tank may include CNG stored at an elevated pressure (e.g., 200 bar), which may be injected by injector 66 into the combustion chamber 30. However, in other examples, the engine 10 may be configured to operate on other non-lubricating fuels. In one example, the engine 10 only operates on CNG.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Turning now to FIG. 2, it shows an internal combustion engine 202, which is embodied as a traction engine of a motor vehicle. In one example, the internal combustion engine 202 may be used similarly to engine 10 of FIG. 1.

The internal combustion engine 202 in the present exemplary embodiment is a reciprocating piston internal combustion engine which is embodied as a spark-ignition engine. In contrast to the present exemplary embodiment, the internal combustion engine 202 can also be embodied as a diesel engine. In addition, the internal combustion engine 202 can be turbo-charged and/or supercharged. Furthermore, in the present exemplary embodiment, the internal combustion engine 202 is configured for intake manifold injection (e.g, as a self-induced engine). In contrast to the present exemplary embodiment, the internal combustion engine 202 can also be configured for direct injection without departing from the scope of the present disclosure (as shown in FIG. 1).

The internal combustion engine 202 may be configured to be operated with CNG (compressed natural gas) as an energy source and/or fuel. CNG is understood here to be natural gas which is compressed but still in gaseous phase. In one example, CNG is compressed to approximately 200 bar. Therefore, in the present exemplary embodiment of the internal combustion engine 202, a gas mixture composed of air and natural gas is fed, while with spark-ignition engines operated with gasoline an air/fuel aerosol is fed.

Furthermore, the internal combustion engine 202 in the present exemplary embodiment has a plurality of fuel injection nozzles 230*a*, 230*b*, 230*c*, and 230*d* downstream of a throttle valve (e.g., throttle valve 68 of FIG. 1) of the internal combustion engine 202. In one example, one of the plurality of fuel injection nozzles 230*a*, 230*b*, 230*c*, and 230*d* may be used similarly to fuel injector 66 of FIG. 1.

The fuel injection nozzles 230*a*, 230*b*, 230*c*, and 230*d* each end at the respective individual ends of the intake manifold, upstream of the respective cylinder inlet valves of the internal combustion engine 202. In other words, the internal combustion engine 202 may be shaped for multi-point injection (MPI), in which the CNG is injected in a decentralized fashion at the respective individual ends of the injection manifold, upstream of a cylinder inlet valve.

Alternatively, the fuel injection nozzles 230*a*, 230*b*, 230*c*, and 230*d* can also be shaped to inject CNG directly into the respective cylinder of the internal combustion engine 202. In addition, the internal combustion engine 202 may also be shaped for central point injection (CPI) into the intake manifold of the internal combustion engine 202.

For desired operation of the fuel injection nozzles 230*a*, 230*b*, 230*c*, and 230*d* it is desired to provide a threshold amount of lubrication to mitigate degradation of the fuel injection nozzles. However, this threshold lubrication may not be supplied solely by the fuel CNG. As described above, this issue may not be present in traditionally fueled engines using diesel or gasoline, as diesel and gasoline may also serve as lubricants. Thus, the CNG fuel injection nozzles may demand a separate source of lubrication outside of a CNG conduit.

In order to supply the threshold amount of lubrication and therefore increase a service life and operational reliability of the internal combustion engine 202, a device 204 for metering lubricant for the fuel injection nozzles 230a, 230b, 230c, and 230d is provided.

The device 204 for metering lubricant may comprise, in the present exemplary embodiment, an injection rail 208 which may be connected to the fuel injection nozzles 230a, 230b, 230c, and 230d in a CNG-conducting and a lubricant-conducting fashion.

In addition, the device 204 for metering lubricant may comprise an oil port 220 and a pressure port 222.

The oil port 220 may be connected, in the present example embodiment, to a lubricant circuit (not illustrated) of the internal combustion engine 202, with which components of the internal combustion engine 202, such as pistons mounted in cylinders, can be lubricated. For this purpose, the oil port 220 can be connected to an oil gallery or to an oil sump of the internal combustion engine 202. In contrast to the present exemplary embodiment, convenient refilling can also be carried out through the oil port when the lubricant supply is exhausted.

The pressure port 222 may be connected via a branch line 218 in a CNG-conducting fashion to a gas line 216 with which CNG may be fed to the injection rail 208. In this context, a gas pressure regulator 206 for regulating the gas pressure of the CNG is arranged to the gas line 216. The gas pressure regulator 206 may be a PID controller.

Via the branch line 218 it is possible to build up a feed pressure via which lubricant may be fed during operation to the fuel injection nozzles 230a, 230b, 230c, and 230d, as will be explained later.

The injection rail 208 may comprise a first volume 210 for holding lubricant and a second volume 214 for holding CNG. In this context, the first volume 210 may be separated from the second volume 214 via a separator element 212.

The gas line 216 may terminate in the first volume 210, while both the oil port 220 and the pressure port 222 terminate in the second volume 214. That is to say, the gas line 216 may be fluidly coupled to the first volume 210, while the oil port 220 and the pressure port 222 are fluidly coupled to the second volume 214

The separator element 212 may comprise a plate-shaped body. In addition, the separator element 212 is embodied so as to be permeable to lubricant, with the result that during operation the threshold amount of lubricant may pass from the second volume 214 into the first volume 210, from where lubricant may then pass to the fuel injection nozzles 230a, 230b, 230c, and 230d.

For this purpose, the separator element 212 in the present exemplary embodiment has a sponge-like structure at least in certain sections. The separator element 212 can be fabricated from a foamed material, such as e.g. plastic or metal. In this context, the separator element has an open-celled construction in the sections with the sponge-like structure so that the cell walls may not be closed but rather extend from the upper side 226 of the separator 212 on the side of the second volume 214 as far as an underside 228 of the separator element 212 on the side of the first volume 210, with the result that the separator element 212 can take up fluids and allow them to pass.

Furthermore, the separator element 212 may comprise a semi-permeable layer for the lubricant at least in certain sections. For example, the separator element 212 may have sections which permit only molecules with less than a specific mole mass or colloids or particles of less than a specific size to pass through, while relatively large molecules or colloids cannot pass. As such, liquids may be filtered by size.

In addition, the separator 212 may be a perforated plate at least in certain sections. The plate may be perforated during its manufacture or after its manufacture by introducing through-openings which extend from the upper side 226 of the separator element 212 to the underside 228 of the separator element 212.

In one example, to block CNG from flowing from the first volume 210 to the second volume 214, a pressure of the first volume 210 may be maintained equal to or less than a pressure of the second volume 214. Additionally or alternatively, the separator 212 may be configured to become saturated with lubricant, such that the lubricant and surfaces of the separator 212 may combine to block CNG flow from the first volume 210 to the second volume 214.

During operation, CNG is fed from a high-pressure tank through the gas line 216 to the gas pressure regulator 206 and its pressure is reduced by the gas pressure regulator 206 to then to be fed to the fuel injection nozzles 230a, 230b, 230c, and 230d of the internal combustion engine 202 through the first volume 210 of the injection rail 208. In one example, CNG from the high-pressure tank may comprise a pressure similar to 200 bar, wherein the gas pressure regulator 206 decreases the pressure of the CNG to 10 to 20 bar before feeding the CNG to the fuel injection nozzles 230a, 230b, 230c, and 230d.

At the same time, a reduced pressure, (e.g. of 30 bar), is applied to the lubricant which has been introduced through the oil part 220 into the first volume 210. In one example, the lubricant is oil. Therefore, the lubricant in the second volume 214 is at a higher pressure than the CNG in the first volume 210. The pressure difference has the effect that lubricant flows through the separator element 212 and then also passes from the first volume 210 to the fuel injection nozzles 230a, 230b, 230c, and 230d of the internal combustion engine 202.

Turning now to FIG. 3, it shows a second embodiment 300 of the device 204 for metering lubricant. The second embodiment may aim to improve the supply of lubricant to the fuel injection nozzles 230a, 230b, 230c, 230d of the internal combustion engine 202 which is operated with CNG as a fuel.

The device 204 for metering lubricant according to the second exemplary embodiment 300 differs from the device 204 for metering lubricant according to the first exemplary embodiment 200 in that a feed pressure regulator 224 is arranged in the branch line 218.

The feed pressure regulator to 224 can be a PID controller with which the gas pressure and therefore indirectly the feed pressure are regulated. In one example, the feed pressure regulator 224 may be electronically coupled to the controller 12, such that the feed pressure regulator 224 may receive signals from the controller to adjust a pressure of lubricant in the branch line 218.

With this device 204 for metering lubricant it is also possible to improve the supply of lubricant to the fuel injection nozzles 230a, 230b, 230c, 230d of the internal combustion engine 202 which is operated with CNG as a fuel.

Additionally or alternatively, a pump 342 may be fluidly coupled to the second volume 214 via the oil port 220. The pump 342 may flow lubricant to the oil port 220 from a lubricant source 344. The lubricant source 344 may be one or more of a crankcase, an oil sump, a transmission, and other device that receives lubricant (e.g., oil). In some examples, the pump may be used to adjust a pressure of the second volume 214. For example, if the pump 342 is commanded to flow more lubricant to the second volume 214, then a pressure of the second volume may increase.

As will be described below, a pressure difference between the first volume 210 and the second volume 214 may determine an amount of lubrication provided to the plurality of injectors. For example, if the pressure difference increases, then more lubricant may flow from the second volume to the first volume. Thus, if the pressure difference decreases, then less lubricant may flow from the second volume to the first volume. In one example, if the pressure difference is 0 or less, then no oil may flow from the second volume to the first volume.

Turning now to FIG. 4 it shows a method 400 for regulating lubricant flow to a plurality of fuel injection nozzles. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402 which includes determining current engine operating parameters. Current engine operating parameters may include one or more of but is not limited to a throttle position, manifold vacuum, engine temperature, engine speed, EGR flow rate, and air/fuel ratio.

The method 400 proceeds to 404, which may include determining if lubrication is desired, which may be determined based on one or more of a friction coefficient, combustion temperature, and injection pressure. In some examples, a lubrication amount may be tracked over time, wherein it may be desired to maintain the lubrication amount above a threshold amount. The threshold amount may be a non-zero number based on an amount of lubrication desired to decrease friction between fuel injector parts. If lubrication is not desired, then the method 400 may proceed to 406 which may include maintaining current engine operating parameters. Lubrication may not be desired when the fuel injectors are sufficiently lubricated (e.g., the lubrication amount is greater than the threshold amount), if the fuel injectors are deactivated, and/or if an oil temperature is less than a threshold temperature (e.g., a cold-start). Additionally or alternatively, lubrication may not be desired based on lubrication demands of other lubricated components. For example, if a transmission lubrication demand is relatively high (e.g., an amount of lubrication desired is high), then lubrication of the transmission may be prioritized over lubrication of the fuel injectors. As will be described below, in some examples, an amount of lubrication demanded by the fuel injectors may be reduced in response to other components demanding relatively high amounts of lubrication.

If lubrication is desired, then the method 400 may proceed to 408 to increase an oil pressure to a pressure greater than a CNG pressure. The CNG pressure may be substantially equal to a pressure sensed by a pressure sensor in a first volume of a device (e.g., first volume 210 of device 204 of FIGS. 2 and 3). Additionally or alternatively, the CNG pressure may be substantially equal to a pressure setting of a pressure regulator (e.g., pressure regulator 206 of FIGS. 2 and 3. The oil pressure may increase via actuation of the variable oil pump (e.g., oil pump 342 of FIG. 3). The oil pump may flow a greater volume of oil to the second volume of the device so that a pressure of the second volume may increase. This may increase a pressure differential between the second volume housing the lubricant (e.g., oil) and the first volume. In some examples, additionally or alternatively, the pressure regulator 206 may be configured to increase the pressure of the lubricant in the second volume as described above. In this way, each of the pump and the pressure regulator may be utilized to increase the pressure of the second volume to adjust oil flow to the first volume and thereby, to the injectors.

The method 400 may proceed to 410, which may include determining if more lubrication is desired. More lubrication may be desired if an engine load increases and/or if the engine temperature increases. If more lubrication is desired, then the method 400 may proceed to 412 to increase oil pressure. Similar to 408, the oil pressure may be increased by increasing an amount of oil flowing from the oil pump to the second volume. In this way, a pressure difference between the second volume and the first volume may increase, thereby allowing more oil to pass through the separator and into the first volume, where the oil may mix with the CNG and flow to the fuel injectors. It will be appreciated that the injectors may comprise an apparatus that allows the injectors to inject CNG without injecting oil into the combustion chamber.

If more lubrication is not desired, then the method 400 may proceed to 414, which may include determining if less lubrication is desired. Less lubrication may be desired if engine load is decreasing and/or if the engine temperature is decreasing. Additionally or alternatively, less lubrication may be desired if another vehicle component demands a relatively high amount of lubrication, where the component may be prioritized over the fuel injectors. For example, if a transmission demands a high amount of lubrication, then a lubrication demand of the fuel injectors may be decreased so that the transmission lubrication demand may be met. If less lubrication is desired, then the method 400 may proceed to 416, which may include decreasing an oil pressure. This may include flowing less oil to the second volume so a pressure of the second volume decreases, thereby decreasing a pressure difference between the second volume (e.g., oil) and the first volume (e.g., mix of CNG and oil). By decreasing the pressure difference, less oil may flow through the separator and into the first volume.

If less lubrication is not desired, then the method 400 may maintain current operating parameters, similar to 406 described above, which may include maintaining a flow rate of oil to the second volume so that a current amount of lubrication remains unchanged.

Turning now to FIG. 5, it shows a plot 500 illustrating an engine operating sequence. Plot 510 illustrates a lubricant pressure in the second volume of the device. Plot 512, illustrated as a dashed line, illustrates a pressure of the first volume, which may comprise a mixture of lubrication and CNG. Plot 520 illustrates an amount of lubrication. Plot 522, illustrated as a dashed line, illustrates an amount of lubrication desired. During some conditions, plot 520 may track plot 522 such that the amount of lubrication provided is equal to the amount of lubrication desired. In such an event, the plot 522 may be occluded by the plot 520. Time increases from a left to right side of the figure.

Prior to t1, the pressure of the lubricant in the second volume (plot 510) is substantially equal to a pressure of the first volume (plot 512). As described above, the first volume may comprise a mixture of CNG and lubricant (e.g., oil). However, under the present circumstances where the second volume pressure is substantially equal to the first volume pressure, lubricant may not pass through the separator from the second volume to the first volume. Additionally, the separator is shaped such that CNG may not flow through the separator from the first volume to the second volume. This may be due to the separator being saturated with lubricant, such that the pores of the separator are filled with lubricant, thereby blocking CNG from flowing therethrough. Furthermore, the amount of lubrication provided is relatively low (e.g., zero). However, if amount of lubrication desired is between a high and low amount. Thus, the fuel injectors demand some amount of lubrication.

At t1, the second volume pressure begins to increase to a pressure greater than the second volume pressure. The second volume pressure may increase by flowing more lubricant to the second volume via a pump (e.g., oil pump 342 of FIG. 3). By doing this, the second volume pressure may increase. Between t1 and t2, the second volume increases to a pressure greater than the first volume pressure. As such, lubricant from the second volume may pass through the separator and enter the first volume, where the lubricant may flow to the fuel injectors and provide some amount of lubrication. As shown, the pressure difference between the second volume and the first volume provides an amount of lubricant (plot 520) matching the amount of lubrication desired (plot 522).

At t2, the amount of lubrication desired begins to increase. Between t2 and t3, the amount of lubrication desired continues to increase above the amount of lubrication provided. This may occur in response to a temperature increase, wherein the lubricant density may be reduced and the lubrication it provides is less efficient.

At t3, the second volume pressure begins to increase as more lubricant is flowed thereto via the pump. As such, the amount of lubricant provided also increases. Between t3 and t4, the second volume pressure rises to a pressure greater than the first volume pressure. In one example, the second volume pressure between t3 and t4 is greater than the second volume pressure between t1 and t2. As such, the pressure difference between the second volume and the first volume is higher between t3 and t4 than it was between t1 and t2, and as a result, the amount of lubricant flowing to the fuel injectors increases to match the increased amount of lubrication desired.

At t4, the amount of lubrication desired begins to decrease. Between t4 and t5, the amount of lubrication desired continues to decrease.

At t5, the second volume pressure begins to decrease in response to the amount of lubrication desired decreasing. As such, the amount of lubrication provided may also decrease as the pressure difference between the second volume and the first volume decreases. After t5, the amount of lubrication provided becomes equal to the amount of lubrication desired as the second volume pressure decreases to a pressure closer to the first volume pressure. As such, the pressure difference between the first and second volumes decreases, resulting in less lubricant flow from the second volume to the first volume. As a result, the amount of lubrication provided decreases to the amount of lubrication desired.

In this way, a device may comprise two volumes partially separated via a porous element selectively allowing material to pass from a second volume to a first volume. The device may be shaped to receive CNG in the first volume and lubricant in the second volume, wherein an amount of lubricant flowing from the second volume to the first volume may be metered. The technical effect of metering lubricant flow to the first volume may be to meet a desired lubrication amount for the fuel injectors while preserving a sufficient amount of lubricant for other vehicle components.

In another representation, a system comprises a device comprising a first volume configured to deliver compressed-natural-gas directly to an injection rail, a first volume fluidly coupled to a lubricant port, wherein the first volume and the second volume are separated by a separator element shaped to allow lubricant to flow from the second volume to the first volume. A first example of the system further includes where the separator element is further shaped to block compressed-natural-gas from flowing to the second volume from the first volume. A second example of the system, optionally including the first example, further includes where at least a portion of the separator element comprises a sponge structure. A third example of the system, optionally including the first and/or second examples, further includes where at least a portion of the separator element comprises a semi-permeable layer. A fourth example of the system, optionally including one or more of the first through third examples, further includes where at least a portion of the separator element comprises a perforated plate. A fifth example of the system, optionally including one or more of the first through fourth examples, further includes where the compressed-natural-gas is delivered to the first volume via a gas line, the gas line coupled to a branch line comprising a pressure regulator for depressurizing the compressed-natural-gas as it flows to the first volume, and where the branch line is coupled to a pressure port of the second volume.

In another, further representation of a system, the system comprises a housing comprising a first volume shaped to receive fuel and a second volume shaped to receive lubricant, where the first volume is directly coupled to a plurality of fuel injectors, wherein the second volume is separated from the first volume via a porous barrier, the porous barrier shaped to allow fluid to flow only from the second volume to the first volume, and a controller with computer-readable instructions stored on non-transitory memory thereof that when executed enable the controller to adjust lubricant flow to from the second volume to the first volume by adjusting a second volume pressure. A first example of the system further includes where a pressure regulator arranged in a gas line for depressurizing fuel flowing to the first volume and increasing the second volume pressure. A second example of the system, optionally including the first example, further includes where a lubricant pump shaped to flow lubricant to the second volume, wherein the instructions further enable the controller to increase a lubricant flow from the lubricant pump to the second volume to increase lubricant flow from the second volume to the first volume. A third example of the system, optionally including the first and/or second examples, further includes where the instructions further enable the controller to decrease the lubricant flow from the lubricant pump to the second volume to decrease lubricant flow from the second volume to the first volume. A fourth example of the system, optionally including one or more of the first through third examples, further includes where at least a portion of the porous barrier is one or more of a sponge, semi-permeable membrane, and a perforated plate. A fifth example of the system, optionally including one or more of the first through third examples, further includes where the fuel is compressed-natural-gas. A sixth example of the system, optionally including one or more of the first through fifth examples, further includes where the second volume is free of fuel.

In another representation, a method comprises increasing a pressure of a second volume of a housing, the second volume containing lubricant and flowing lubricant from the second volume to a first volume of the housing, the second volume fluidly coupled to a gas line and a plurality of fuel injectors. A first example of the method, further includes where the increasing is in response to a lubricant demand increasing, wherein the lubricant demand increases in response to a lubricant temperature increasing. A second example of the method, optionally including the first example, further includes where decreasing the pressure of the second volume in response to a lubricant temperature decreasing. A third example of the method, optionally including the first and/or second examples, further includes where flowing lubricant from the second volume to the first volume further comprises flowing lubricant through a barrier separating the first volume from the second volume within the housing. A fourth example of the method, optionally including one or more of the first through third examples, further includes where the gas line is shaped to flow compressed natural gas and the plurality of fuel injectors are shaped to inject compressed natural gas. A fifth example of the method, optionally including one or more of the first through fourth examples, further includes where decreasing a pressure of compressed natural gas in the gas line via a pressure regulator as compressed natural gas flows to the first volume. A sixth example of the method, optionally including one or more of the first through fifth examples, further includes where equalizing a pressure between the first volume and the second volume in response to a lubricant demand being absent.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a device comprising a first volume configured to receive compressed-natural-gas via a gas line that terminates in the first volume and deliver the compressed-natural-gas directly to an injection rail, and a second volume fluidly coupled to a lubricant port, where the lubricant port is an oil port that terminates in the second volume, wherein the first volume and the second volume are separated by a separator element shaped to allow lubricant to flow from the second volume to the first volume.

2. The system of claim 1, wherein the separator element is further shaped to block compressed-natural-gas from flowing to the second volume from the first volume.

3. The system of claim 1, wherein at least a portion of the separator element comprises a sponge structure.

4. The system of claim 1, wherein at least a portion of the separator element comprises a semi-permeable layer.

5. The system of claim 1, wherein at least a portion of the separator element comprises a perforated plate.

6. The system of claim 1, wherein the compressed-natural-gas is delivered to the first volume via a gas line, the gas line coupled to a branch line comprising a pressure regulator for depressurizing the compressed-natural-gas as it flows to the first volume, and where the branch line is coupled to a pressure port of the second volume.

7. A system comprising:
a housing comprising a first volume shaped to receive fuel and a second volume shaped to receive lubricant, where the first volume is directly coupled to a plurality of fuel injectors, the first volume configured to receive compressed-natural-gas via a gas line that terminates in the first volume, wherein a lubricant port that is an oil port terminates in the second volume, wherein the second volume is separated from the first volume via a porous barrier, the porous barrier shaped to allow fluid to flow only from the second volume to the first volume; and
a controller with computer-readable instructions stored on non-transitory memory thereof that when executed enable the controller to:
adjust lubricant to flow from the second volume to the first volume by adjusting a second volume pressure.

8. The system of claim 7, further comprising a pressure regulator arranged in the gas line for depressurizing fuel flowing to the first volume and increasing the second volume pressure.

9. The system of claim 7, further comprising a lubricant pump shaped to flow lubricant to the second volume, wherein the instructions further enable the controller to increase a lubricant flow from the lubricant pump to the second volume to increase lubricant flow from the second volume to the first volume.

10. The system of claim 9, wherein the instructions further enable the controller to decrease the lubricant flow from the lubricant pump to the second volume to decrease lubricant flow from the second volume to the first volume.

11. The system of claim 7, wherein at least a portion of the porous barrier is one or more of a sponge, semi-permeable membrane, and a perforated plate.

12. The system of claim 7, wherein the second volume is free of fuel.

13. A method comprising:

increasing a pressure of a second volume of a housing, the second volume containing lubricant; and flowing lubricant from the second volume to a first volume of the housing comprising compressed-natural-gas, the first volume fluidly coupled to a gas line that terminates in the first volume and a plurality of fuel injectors, wherein the lubricant is received via a lubricant port, the lubricant port being an oil port that terminates in the second volume.

14. The method of claim 13, wherein the increasing is in response to a lubricant demand increasing, wherein the lubricant demand increases in response to a lubricant temperature increasing.

15. The method of claim 13, further comprising decreasing the pressure of the second volume in response to a lubricant temperature decreasing.

16. The method of claim 13, wherein flowing lubricant from the second volume to the first volume further comprises flowing lubricant through a barrier separating the first volume from the second volume within the housing.

17. The method of claim 13, wherein the gas line is shaped to flow compressed natural gas and the plurality of fuel injectors are shaped to inject compressed natural gas.

18. The method of claim 17, further comprising decreasing a pressure of compressed natural gas in the gas line via a pressure regulator as compressed natural gas flows to the first volume.

19. The method of claim 17, further comprising equalizing a pressure between the first volume and the second volume in response to a lubricant demand being absent.

* * * * *